United States Patent

Guyonnet

Patent Number: 5,992,043
Date of Patent: Nov. 30, 1999

[54] METHOD FOR TREATING WOOD AT THE GLASS TRANSITION TEMPERATURE THEREOF

[75] Inventor: René Guyonnet, Saint-Etienne, France

[73] Assignee: N O W (New Option Wood), Saintes, France

[21] Appl. No.: 09/043,473

[22] PCT Filed: Jul. 25, 1997

[86] PCT No.: PCT/FR97/01395

§ 371 Date: Mar. 23, 1998

§ 102(e) Date: Mar. 23, 1998

[87] PCT Pub. No.: WO98/04392

PCT Pub. Date: Feb. 5, 1998

[30] Foreign Application Priority Data

Jul. 26, 1996 [FR] France .................. 96 09455

[51] Int. Cl.⁶ .................................................. F26B 7/00
[52] U.S. Cl. .................. 34/382; 34/388; 34/398
[58] Field of Search .................. 34/380, 382, 388, 34/389, 396, 398, 422, 426; 144/359, 380; 427/351, 370, 397, 439, 440; 65/21.4, 22, 142

[56] References Cited

U.S. PATENT DOCUMENTS

| 4,620,373 | 11/1986 | Laskowski et al. ........... 34/406 |
| 5,030,483 | 7/1991 | Drinkard, Jr. ................ 427/336 |
| 5,343,913 | 9/1994 | Tanahashi et al. ........... 144/380 |
| 5,678,324 | 10/1997 | Vittaniemi et al. ........... 34/396 |
| 5,752,328 | 5/1998 | Yamamoto .................... 34/418 |

FOREIGN PATENT DOCUMENTS

| 0 018 446 | 11/1980 | European Pat. Off. |
| 2 604 942 | 4/1988 | France. |
| 2 720 969 | 12/1995 | France. |
| WO 94/27102 | 11/1994 | WIPO. |

Primary Examiner—Henry Bennett
Assistant Examiner—Steve Gravini
Attorney, Agent, or Firm—Young & Thompson

[57] ABSTRACT

A wood treatment method wherein a piece of wood to be treated is heat treated at high temperature for a predetermined time. According to the method, the piece of wood is heated to its glass transition temperature (Tg) prior to the heat treatment, and maintained thereat until the whole of the piece of wood has reached the glass transition temperature (Tg).

10 Claims, 2 Drawing Sheets

METHOD FOR TREATING WOOD AT THE GLASS TRANSITION TEMPERATURE THEREOF

The present invention relates to a method for treating wood in the natural state as well as to a material obtained in accordance with this method.

It is known that, in the natural state, wood, or the wood fibers which are in contact with a humid atmosphere, tend to be logged with water, going as far as absorbing it up to the value of their own weight. Such absorption of water is accompanied, on the one hand, by a swelling and, on the other hand, by a loss of the mechanical qualities and the qualities of cohesion of the material which, in certain cases, can go as far as an advanced disintegration thereof. This is why the habit is taken, before every step of machining wood, of effecting a drying step which, by eliminating the water therefrom, improves its dimensional stability.

Although the drying step enables the water to be eliminated from the wood, it in no way modifies its hydrophilic nature, with the result that it is again likely to reabsorb the water eliminated during the drying, when it is again in a humid atmosphere.

In order to decrease the hydrophilic nature of the natural wood and thus give it a long-lasting dimensional stability, different techniques of heat treatment at high temperature have been proposed. For example, it has been proposed, particularly in French Patent FR-A-2 512 053, to heat a fragmented ligneous matter, possibly in an agglomerate form, under a neutral atmosphere to a temperature of between 200° C. and 280° C. Although such a treatment makes it possible to obtain a dimensionally stabilized wood, it reduces, on the other hand, the mechanical qualities of the material.

It has also been proposed to subject the natural wood to different treatment steps including in particular a drying in open circuit followed by a progressive heating and maintenance in closed circuit at a temperature included between 180° C. and 280° C. Apart from the fact that such a technique does not enable a dimensional stability and a decrease in the hydrophilic character of the treated wood to be constantly obtained, it is accompanied most of the time by the formation therein of cracking and splitting.

It is an object of the present invention to propose a method of treating wood which gives said wood a hygrophobic character and a good dimensional stability, without provoking the creation of cracking and splitting.

The present invention thus has for its object a method of treating wood, of the type in which a piece of wood to be treated is subjected to a heat treatment, of the so-called high-temperature type, for a determined time, characterized in that it comprises a step prior to the heat treatment during which the piece of wood is subjected to a temperature equal to its glass transition temperature, and said piece of wood is maintained at this temperature as long as it has not completely reached said glass transition temperature.

Applicants have thus established, by tests carried out in the laboratory on numerous different essences of wood, that, by maintaining the wood to be treated at its glass transition temperature for a determined time, sufficient for the whole of its mass to reach said temperature, all the phenomena of formation of splitting and cracking of the wood which usually occurred when the latter was subjected to a high-temperature treatment, were subsequently avoided.

Such a treatment may be effected in a chamber, and in that case the piece of wood to be treated may be subjected to a progressive, even linear, increase of the temperature. This treatment may also be effected by immersion of the wood to be treated in a heat-regulated bath, for example a liquid bath or a solid bath formed by fine solid particles.

It is known that the glass transition temperature of wood corresponds to the zone of temperature where the elements constituting said wood, i.e. those which give it its characteristics of rigidity, precisely lose this character of rigidity, so that the material passes from a rigid state to a supple state, which allows the internal stresses of the wood to be released.

In order to determine the necessary time during which the wood to be treated must be subjected to the glass transition temperature for the whole of the material to reach this temperature, it is possible, prior to the operation of heat-treatment, to run a series of tests on samples of wood of the same essence, the same mass and substantially of the same dimensions, in which temperature sensors are disposed, particularly at the core of the material. These sensors make it possible, by measuring the temperature at different points of the piece, to determine the time necessary for all the points thereof, and particularly the core, to have reached the glass transition temperature. It will then suffice, during the industrial treatment process, to maintain the piece of wood at the glass transition temperature for this time. It is also possible to dispose measurement sensors in a piece serving as control and to stop the treatment when all the sensors, and particularly a sensor disposed at the core of this control, have reached the glass transition temperature.

According to the invention, this step of glass transition of the wood may be employed to exert on the wood, with the aid of an appropriate device, a mechanical stress capable of giving it a particular desired shape. This mechanical stress may also be used to densify the piece of wood over all or part of its volume, which has for effect to improve its mechanical characteristics.

An embodiment of the present invention will be described hereinafter by way of non-limiting example, with reference to the accompanying drawings, in which.

EXAMPLE 1

Figure 1:
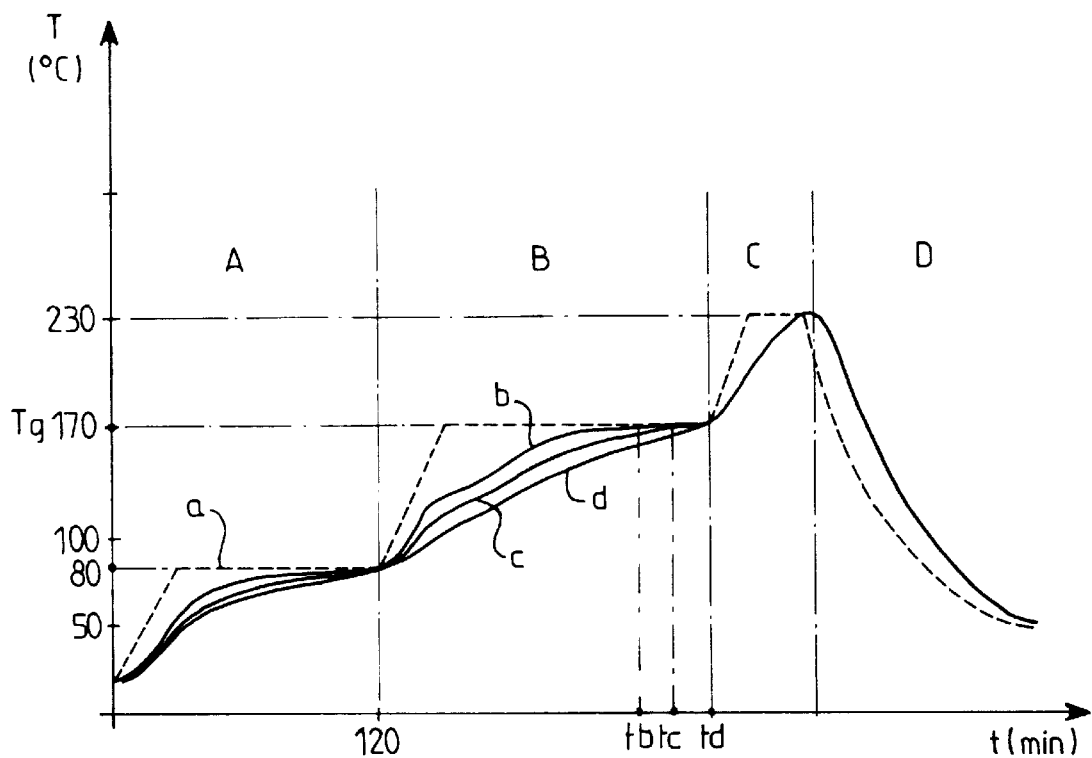
FIG. 1 is a diagram representing the temperature variation curves of the treatment chamber and of the treated wood, namely ash, as a function of time, when carrying out a method of treating wood according to the invention.

In a first example of the method of treatment according to the invention, a piece of wood 1 coming from an essence of wood of the deciduous tree type, namely ash, whose shape was parallelepipedic and whose dimensions were 98 cm in length over a section of 2.7 cm×8 cm, was treated. A treatment chamber was employed, constituted by an electric oven which, if desired, may be placed in communication with the atmosphere. Three temperature sensors were introduced in the piece of wood 1, namely a first sensor 3 which was disposed at the periphery of the piece, at about 1 mm from the outer surface thereof, a second sensor 5 which was disposed at the core of the piece, and a third sensor 7 which was disposed in an intermediate position between these two extreme positions.

FIG. 1 reproduces four superposed curves representing the variation as a function of time, on the one hand, of the temperature of the treatment oven (curve a in broken lines in the drawing) and, on the other hand, the respective temperatures picked up by the three sensors 3, 7 and 5 (respective curves b, c, d in solid lines in the drawing). These curves extend over four essential zones referenced A, B, C, D corresponding to four successive steps of the treatment.

Step A corresponds to a drying step, which is of conventional type and which is perfectly known from the prior state of the art. During this step, the temperature of the oven is progressively raised, from ambient temperature up to about 80° C. This step, starting from a wood in which there remains about 10% water, has enabled 6% of water to be eliminated. However, it is known that if, after this step, the wood is brought into contant again with a humid atmosphere, it will immediately absorb water again.

It is therefore necessary to subject the piece of wood 1 to a treatment which will definitively give it a hygrophobic character. This step, which has been mentioned hereinabove, and which is that which corresponds to zone C in FIG. 1, consists in subjecting the piece of wood to a heat treatment which takes it to a temperature of about 230° C. It is during this step that the woods subjected to this type of treatment, according to the prior state of the art, undergo the cracking and splitting mentioned hereinabove.

According to the invention, there is thus carried out, between the step of drying A and the step of treatment C proper, a step of intermediate treatment B, or stabilisation treatment. During this step, the temperature of the oven is progressively raised from the temperature of drying of 80° C. up to the glass transition temperature Tg of ash (or about 170° C.) with a temperature rise speed close to that employed for drying, namely about 4° C./min. The glass transition temperature Tg is that of the average of the constituents of ash, i.e. dry lignins and dry hemicelluloses, of this wood. When the temperature of the treatment chamber reaches the value Tg, viz. the value of about 170° C., temperature adjusting means, with which the treatment oven is provided, maintain the temperature at this level value.

Figure 2:
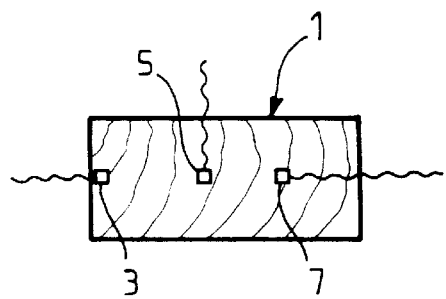
FIG. 2 is a partial view in transverse section of a piece of wood intended to undergo a treatment according to the invention.
Figure 3:
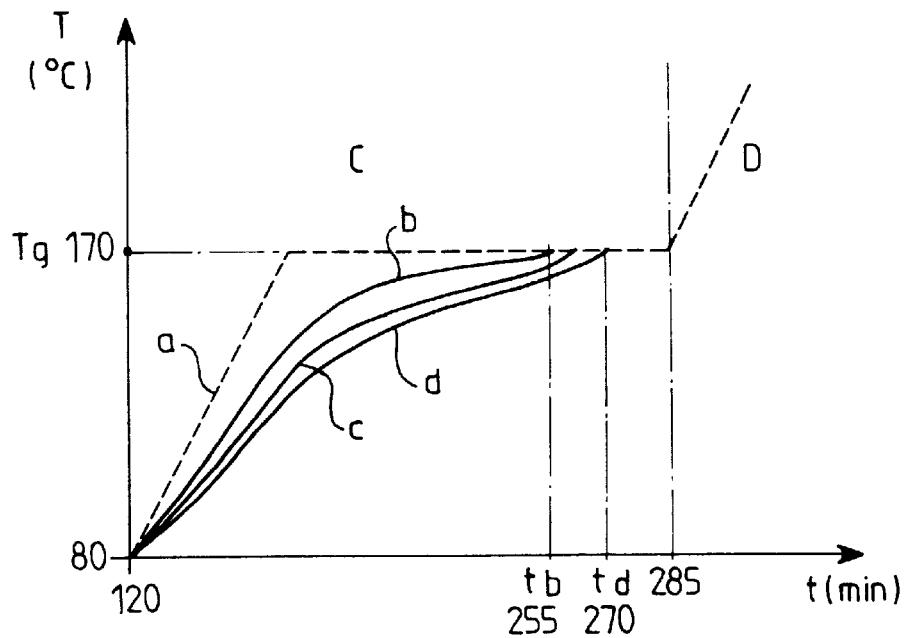
FIG. 3 is a partial diagram of a variant embodiment of FIG. 1 showing on a larger scale the step of treatment at the glass transition temperature.

As may be seen in the diagram of FIGS. 1 to 3, the three zones of the piece of wood comprising the sensors 3, 5 and 7 do not reach the glass transition temperature Tg together. In fact, the sensor 3, closest to the outer surface of the piece of wood 1, attains the temperature Tg the first, at an instant tb close to 255 mins. and the sensor 5 which is disposed at the core of the piece of wood 1 reaches this same temperature Tg the last, at an instant td close to 270 mins. It is therefore important, according to the invention, to maintain the piece of wood to be treated at the temperature Tg until the three sensors 3, 5 and 7 clearly show that the zones of the wood where they are disposed have indeed reached temperature Tg, namely in the present case up to time td of 270 mins.

Applicants have ascertained that, without being detrimental to the quality of the treatment carried out, the maintenance of the piece of wood at temperature Tg could be extended beyond the instant td when the whole of the piece has reached this temperature. In the embodiment of the invention shown in FIG. 3, the level at temperature Tg is extended beyond instant td, by a time equal to the diference of instants td–tb. One is thus virtually sure that the whole of the mass of the piece of wood 1 to be treated has indeed reached the glass transition temperature Tg.

As mentioned previously, the third step of heat treatment proper is then carried out which corresponds to zone C of the curve of FIG. 1 and which consists, in this particular case, in taking the piece of wood 1 to a temperature close to 230° C. in order to subject this piece to a so-called curing treatment, in accordance with a mode of treatment known from the prior state of the art.

After the piece is cooled (zone D in FIG. 1), it is ascertained that the wood obtained was bereft of any splitting or cracking.

EXAMPLE 2

In a second example of the method of treatment according to the invention, a piece of wood 1 coming from an essence of wood of resinous type, namely Scots pine, of parallelepipedic shape and whose dimensions were 90 cm in length over a section of 2.8 cm×9.2 cm, was treated. The treatment was carried out, following a method identical to that described in the first Example. Two temperature sensors were introduced in the piece of Scots pine 1, namely a first sensor 3 which was disposed at the periphery of the piece, at about 1 mm from the outer surface thereof, and a second sensor 5 which was disposed at the core of said piece.

Figure 4:
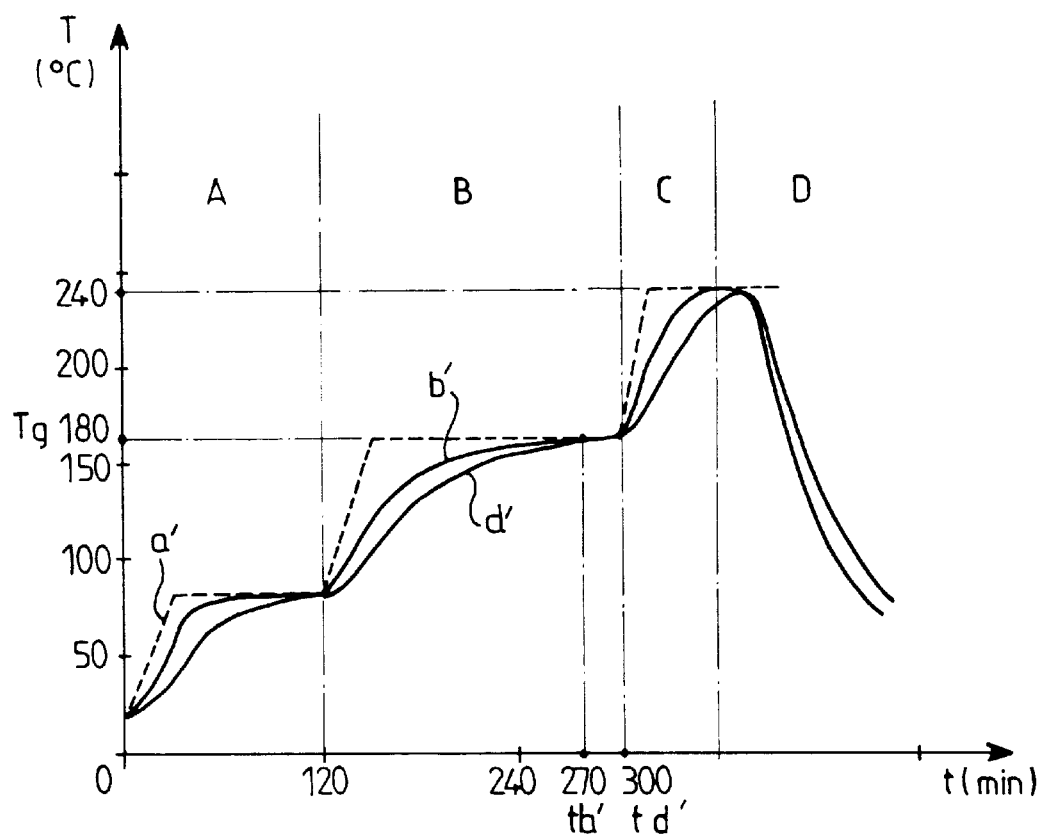
FIG. 4 is a diagram respectively representing the temperature variation curves of the treatment chamber and of the treated wood, namely Scots pine, as a function of time, when carrying out a method of treating wood according to the invention.

FIG. 4 reproduces three superposed curves representing the variation as a function of time, on the one hand, of the temperature of the treatment oven (curve a' in broken lines) and, on the other hand, the respective temperatures picked up by the sensor 3 disposed at the periphery (curve b') and by the sensor 5 disposed at the core of the material (curve d'). As previously, these curves extend over four essential zones referenced A, B, C, D corresponding to the four successive steps of the preceding treatment. It is ascertained on this graph that the glass transition temperature Tg, which is 180° C. in the present case, is reached by the peripheral sensor 3 after a time tb' of about 270 minutes, while this same temperature Tg is reached by the sensor 5 disposed at the core of the piece of wood after a time of about 300 minutes. In the present case, an industrial treatment of pieces of Scots pine wood of the same dimensions will consequently have to ensure maintenance of these pieces of wood at a temperature of 180° C. for a time equal to at least 300 minutes before these pieces undergo a high-temperature heat treatment, such as for example a curing treatment.

The treatment according to the invention may also be effected by immersing the piece of wood to be treated in a heat-regulated bath which is maintained at the glass transition temperature Tg of the wood concerned. The bath may be constituted by a product whose melting temperature is lower than the temperature Tg, such as in particular paraffin, oils of silicone type, etc. . . . The bath may also be constituted by a solid solution formed by fine particles such as in particular particles of sand.

This form of embodiment is particularly advantageous in that it ensures an easier and more precise maintenance of temperature than in the case of the treatment being carried out in a chamber.

Of course, the method of treatment according to the invention may also be carried out in a process of treatment which does not begin by a drying.

According to the invention, advantage may be taken of the malleable nature taken by a piece of wood when it reaches the glass transition temperature, to deform it and give it a chosen conformation. Similarly, a force of compression may be exerted on this piece of wood so as to modify its density and at the same time improve its mechanical characteristics.

I claim:

1. Method of treating wood, of the type in which a piece of wood to be treated is subjected to a heat treatment, of the so-called high-temperature type, for a determined time, characterized in that it comprises a step prior to the heat treatment during which the piece of wood (1) is subjected to a temperature equal to its glass transition temperature (Tg), and said piece of wood is maintained at this temperature as long as it has not completely reached said glass transition temperature (Tg).

2. Method according to claim 1, characterized in that the glass transition temperature (Tg) to which the piece of wood (1) to be treated is subjected, is progressively reached by a substantially linear increase in the temperature.

3. Method according to claim 1, characterized in that the time during which the piece of wood to be treated is subjected to a heating to the glass transition temperature (Tg) of this wood is equal to the time (td) necessary for the core of the piece of wood (1) to reach the glass transition temperature (Tg).

4. Method according to claim 3, characterized in that said time (td) is determined by disposing at the core of the piece of wood (1) to be treated, at least one temperature sensor adapted to furnish the temperature (5) of said core, and the time (td, td') taken by the core of the piece of wood (1) to reach the glass transition temperature (Tg) is determined.

5. Method according to claim 1, characterized in that the heat treatment of the piece of wood (1) at the glass transition temperature (Tg) is effected in a heat-regulated chamber.

6. Method according to claims 1, characterized in that the heat treatment of the piece of wood (1) is effected in a heat-regulated bath in which it is immersed.

7. Method according to claim 6, characterized in that the bath is constituted by fine solid particles.

8. Method according to claim 1, characterized in that a force of compression is exerted on at least a part of the piece of wood, in order to modify the density of that part.

9. Method according to claim 1, characterized in that a force of compression is exerted on at least a part of the piece of wood in order to modify the shape of that part.

10. Material, characterized in that it is obtained in accordance with claim 1.

* * * * *